United States Patent
Saladi et al.

(10) Patent No.: US 10,320,706 B2
(45) Date of Patent: Jun. 11, 2019

(54) INTERFERENCE-AWARE CLIENT PLACEMENT

(71) Applicant: VMware, Inc., Palo Alto, CA (US)

(72) Inventors: Kalyan Saladi, Sunnyvale, CA (US); Madhuri Yechuri, Palo Alto, CA (US); Xiaoyun Zhu, Cupertino, CA (US); Sahan Gamage, Redwood City, CA (US); Puneet Zaroo, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 321 days.

(21) Appl. No.: 14/754,271

(22) Filed: Jun. 29, 2015

(65) Prior Publication Data

US 2016/0380918 A1 Dec. 29, 2016

(51) Int. Cl.
*H04L 12/927* (2013.01)
(52) U.S. Cl.
CPC ................... *H04L 47/805* (2013.01)
(58) Field of Classification Search
CPC ....................................................... H04L 47/805
See application file for complete search history.

(56) References Cited

U.S. PATENT DOCUMENTS

| | | | | |
|---|---|---|---|---|
| 2011/0173327 A1* | 7/2011 | Chen | ..................... | G06F 9/5066 709/226 |
| 2011/0225299 A1* | 9/2011 | Nathuji | ................. | G06F 9/5077 709/226 |
| 2014/0082201 A1* | 3/2014 | Shankari | ................ | H04L 47/70 709/226 |

OTHER PUBLICATIONS

C. Delimitrou et al.; "iBench: Quantifying Interference for Datacenter Applications"; In Proceedings of the IEEE International Symposium on Workload Characterization (IISWC), Sep. 2013.
C. Delimitrou et al.: "Paragon: QoS-Aware Scheduling for Heterogeneous Datacenters"; In Proceedings of the 18th International Conference on Architectural Support for Programming Languages and Operating Systems (ASPLOS), Mar. 2013.
S. Govindan et al.; "Cuanta: Quantifying Effects of Shared On-chip Resource Interference for Consolidated Virtual Machines"; In ACM Symposium on Cloud Computing (SOCC), Oct. 2011.
A. Gulati et al.; "PARDA: Proportional Allocation of Resources for Distributed Storage Access"; In Proceedings of the 7th Conference on File and Storage Technologies, pp. 85-98, Berkeley, CA, USA, 2009, USENIX Association.
A. Gulati et al.; "VMware Distributed Resource Management: Design, Implementation and Lessons Learned"; 2013.
A. Gulati et al.; "BASIL: Automated IO Load Balancing Across Storage Devices"; In Proceedings of the 8th USENIX Conference on File and Storage Technologies, FAST'10, Berkeley, CA, USA, 2010, USENIX Association.

(Continued)

*Primary Examiner* — Vivek Srivastava
*Assistant Examiner* — Nicholas P Celani
(74) *Attorney, Agent, or Firm* — Loza & Loza, LLP

(57) ABSTRACT

A management server and method for performing resource management operations in a distributed computer system utilizes interference scores for clients executing different workloads to create an interference affinity-type rule for at least some of the clients contending for a resource based on the interference scores for that resource. The interference affinity-type rule can then be used to recommend a target host computer to place a client.

12 Claims, 4 Drawing Sheets

(56) References Cited

OTHER PUBLICATIONS

M. Kesavan et al.; "dWeights: Taming the Multi-Headed Monster for VM Placement in the Cloud"; In submitted to RADIO 2012, 2012.
S.-H. Lim et al.; "D-Factor: A Quantitative Model of Application Slow-Down in Multi-Resource Shared Systems"; In 12th ACM Sigmetrics/Performance Joint International Conference on Measurement and Modeling of Computer Systems, Jun. 2012.
R. Nathuji et al.; "Q-Clouds: Managing Performance Interference Effects for QoS-Aware Clouds"; In Eurosys, Apr. 2010.
A. Roytman et al.; "PACMan: Performance Aware Virtual Machine Consolidation"; In International Conference on Autonomic Computing (ICAC), Jun. 2013.
C. A. Waldspurger; "Memory Resource Management in VMware ESX Server"; In Proceedings of the 5th Symposium on Operating Systems Design and Implementation, pp. 181-194, New York, NY, USA, 2002, ACM Press.
R. West et al.; "Online Cache Modeling for Commodity Multicore Processors"; SIGOPS Oper. Syst. Rev., 44(4):19-29, Dec. 2010.
X. Zhang et al.; "CPI2: CPU performance isolation for shared compute clusters"; In SIGOPS European Conference on Computer Systems (EuroSys), pp. 379-391, Prague, Czech Republic, 2013.

\* cited by examiner

INTERFERENCE-AWARE CLIENT PLACEMENT

BACKGROUND

Workload consolidation is one of the fundamental underpinnings of cloud computing, enabling the provider to realize reductions in infrastructure and energy costs and to achieve economies of scale. Consolidation needs to be balanced against the obvious concerns of isolation, not just limited to security, but performance and quality of service (QoS) as well. Thus, placement of clients performing the different workloads, such as virtual machines (VMs), in a physical infrastructure is an important factor in efficiently utilizing the physical resources. An effective client placement strategy must meet the requirements of the clients and optimize several, sometimes conflicting, goals, while taking into consideration the complexities of the physical infrastructure.

Even after the clients have been properly placed in the physical infrastructure, some of these clients may have to be moved or migrated to different hosts for various reasons, such as load balancing. Thus, the selection of appropriate hosts to which the clients will be migrated is an important resource management process.

When making client placement decisions, including client migration decisions, various parameters are considered in making the decisions. Some of the parameters considered relate to resource controls of the clients, such as reservation, limit and share values. However, the parameters currently considered in making client placement decisions may not produce the desired results, for example, with respect to performance and service level agreements (SLAs).

SUMMARY

A management server and method for performing resource management operations in a distributed computer system utilizes interference scores for clients executing different workloads to create an interference affinity-type rule for at least some of the clients contending for a resource based on the interference scores for that resource. The interference affinity-type rule can then be used to recommend a target host computer to place a client.

A method for performing resource management operations in a distributed computer system in accordance with an embodiment of the invention comprises obtaining interference scores for clients executing different workloads, including a client to be placed in the distributed computer system, creating an interference affinity-type rule for at least some of the clients contending for a resource based on the interference scores for that resource, and recommending a target host computer among the host computers of the distributed computer system to place the client using the interference affinity-type rules to take into account workload interferences between the clients. In some embodiments, the steps of this method are performed when program instructions contained in a computer-readable storage medium are executed by one or more processors.

A management server in accordance with an embodiment of the invention comprises a resource management module configured to perform resource management operations in a distributed computer system. The resource management module is further configured to obtain interference scores for clients executing different workloads, including a client to be placed in the distributed computer system. The resource management module comprises an interference rule generation unit configured to create an interference affinity-type rule for at least some of the clients contending for a resource based on the interference scores for that resource, and a client placement engine configured to recommend a target host computer among the host computers of the distributed computer system to place the client using the interference affinity-type rules to take into account workload interferences between the clients.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
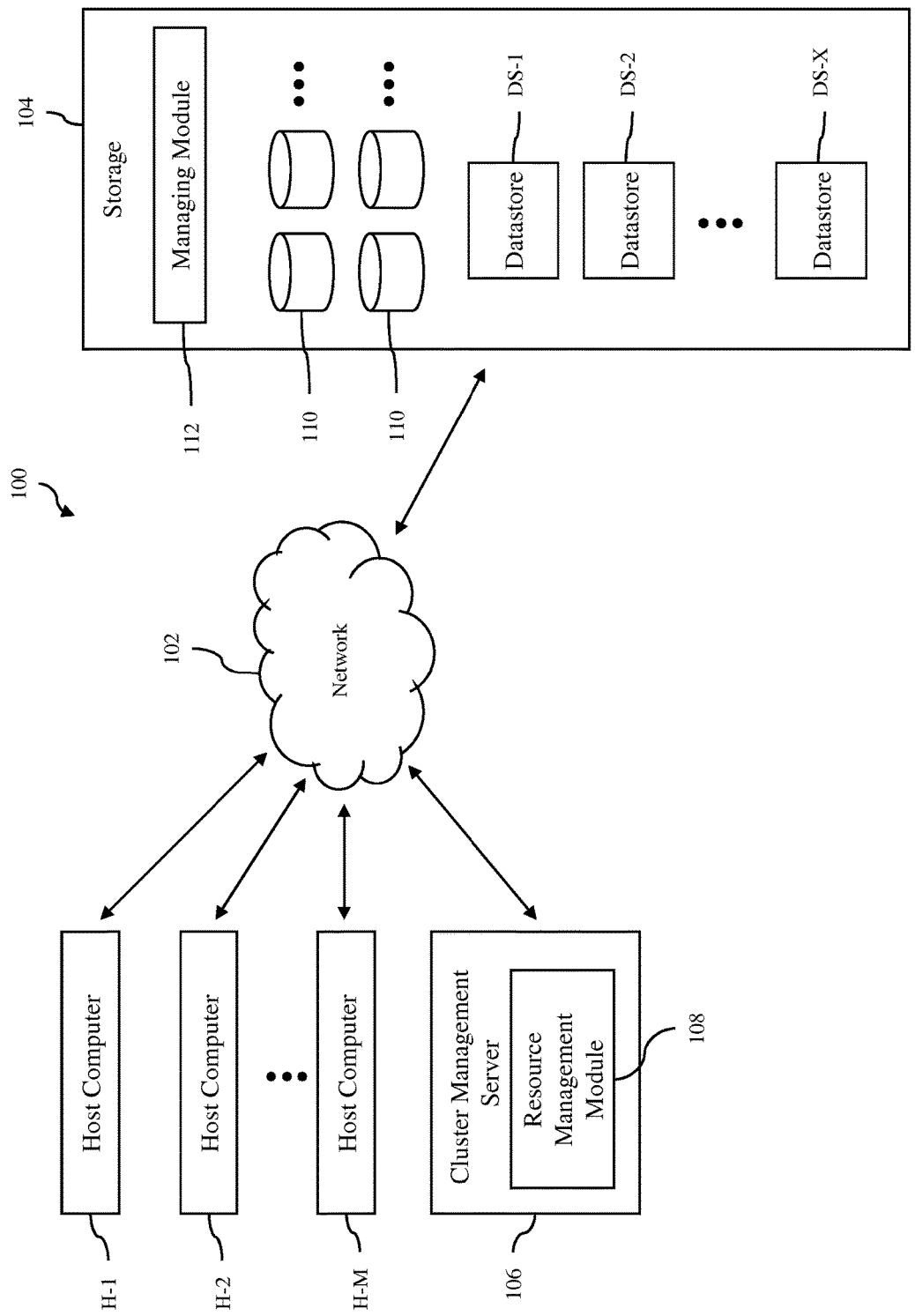
FIG. 1 is a block diagram of a distributed computer system in accordance with an embodiment of the invention.

Turning now to FIG. 1, a distributed computer system 100 in accordance with an embodiment of the invention is shown. As illustrated in FIG. 1, the distributed computer system includes a network 102, a cluster of host computers H-1, H-2 . . . H-M (where M is a positive integer), storage 104 and a cluster management server 106 with a resource management module 108. The host computers, the storage and the cluster management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in datacenters. As an example, the host computers may be servers installed in a single server rack. However, in other embodiments, the host computers may be installed in multiple server racks in the same or different facilities.

Figure 2:
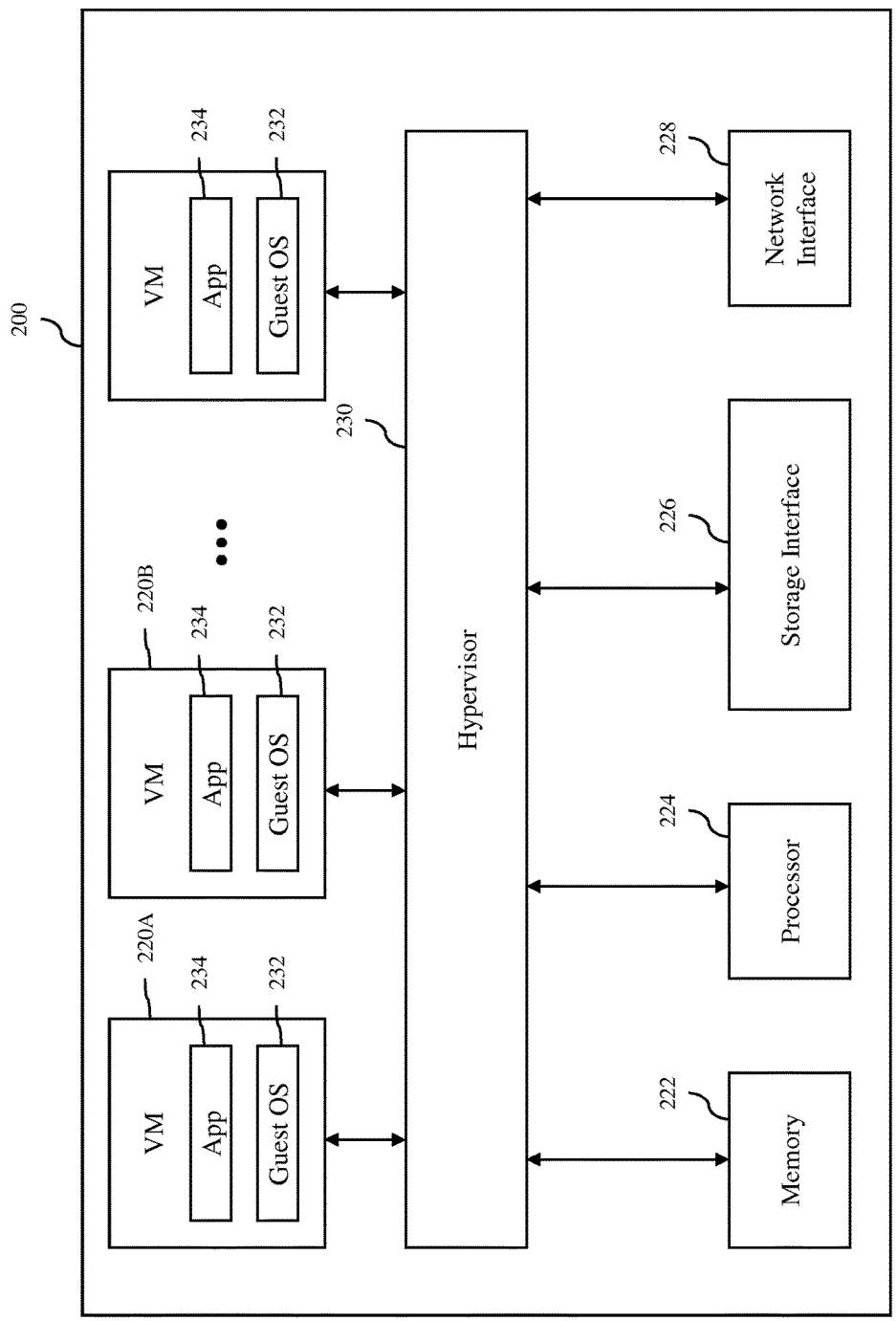
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cluster management server 106 operates to monitor and manage the host computers H-1, H-2 . . . H-M. The cluster management server may be configured to monitor the current configurations of the host computers and the clients running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, i.e., virtualized hardware configuration of each of the clients, such as virtual CPU type, number of virtual CPUs, virtual memory size, and virtual storage size, as well as software configuration of each of the clients, such as OS type and installed applications or software programs running on each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers or the hypervisors hosting the clients by monitoring the current usage of resources by the clients, e.g., CPU processing usage, memory usage, network usage and/or storage usage, and provided to the cluster management server.

The cluster management server 106 may also perform operations to manage the clients and the host computers H-1, H-2 . . . H-M in the cluster. As illustrated in FIG. 1, in an embodiment, the cluster management server includes the resource management module 108, which can be enabled by a user, to perform various resource management operations for the cluster, including client placement operations for either initial client placement and/or load balancing. As described in more detail below, the resource management module operates to perform at least some of the resource management operations, including resource management decisions, based on resource usage contentions or interferences between clients during workload executions. When executing different workloads, clients may contend for resources, such as CPU and memory, which can adversely affect the performance of the clients. For example, with the advent of multicore processors, multiple virtual machines (VMs) scheduled on the same multicore CPU contend for the last-level cache and memory bandwidth. The VMs can slow each other down by evicting each other's data cached in the last-level cache and by contending for the memory bandwidth. A workload issuing random input/output (TO) requests can adversely affect the performance of another workload issuing sequential IOs, as the access pattern visible on the shared storage effectively becomes random.

In some embodiments, the cluster management server 106 may be a physical computer. In other embodiments, the cluster management server may be implemented as one or more software programs running on one or more physical computers, such as the host computer 200 shown in FIG. 2, or virtual computers, such as the 220A, 220B . . . 220L. In an implementation, the cluster management server is a VMware vCenter™ Server with at least some of the features available for such a server, and the resource management module 108 in the cluster management server is VMware vSphere® Distributed Resource Scheduler™.

Figure 3:
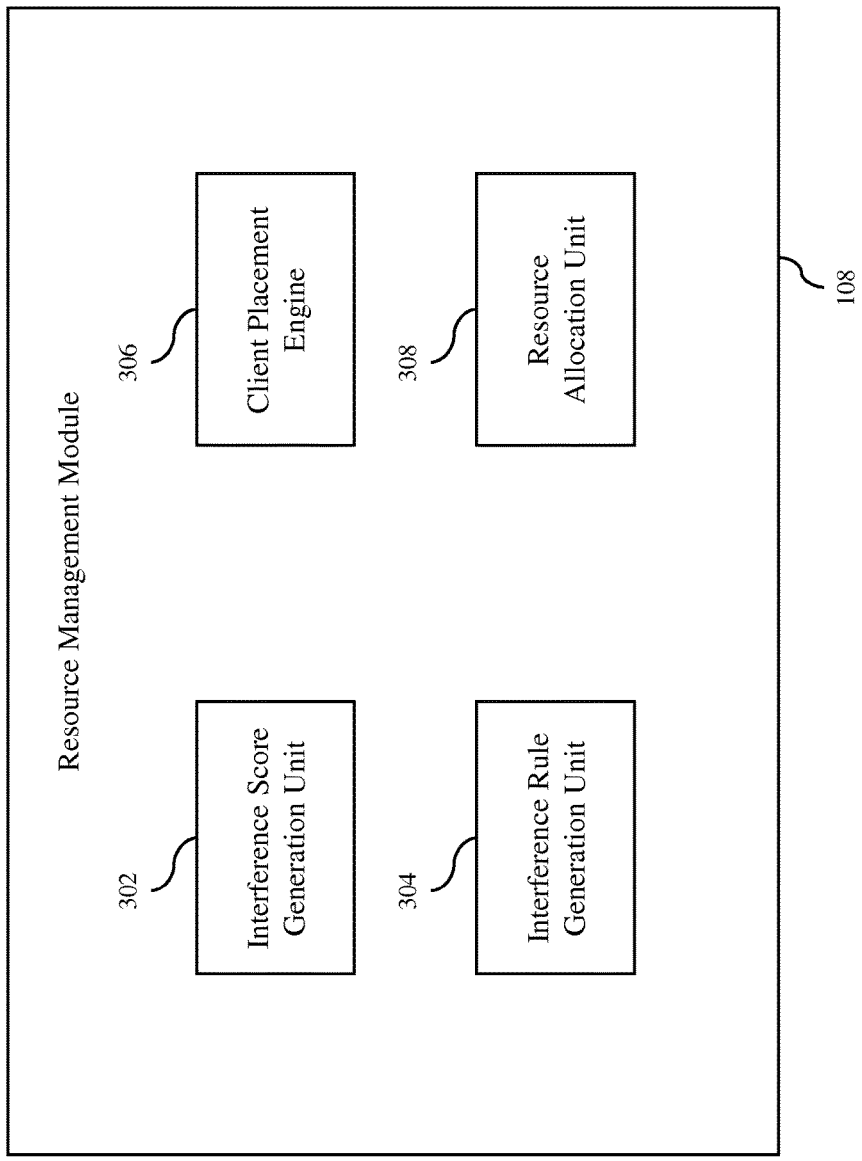
FIG. 3 is a block diagram of a resource management module included in the distributed computer system in accordance with an embodiment of the invention.

Turning now to FIG. 3, components of the resource management module 108 in accordance with an embodiment of the invention are shown. As illustrated in FIG. 3, the resource management module includes an interference score generation unit 302, an interference rule generation unit 304 and a client placement engine 306. As described in more detail below, these components of the resource management module operate to make client placement decisions with awareness of interferences between clients to execute their respective operations. The resource management module further includes other components commonly found in a cluster management server, such as a resource allocation unit 308 that distributes resources to various components in the cluster, such as clients and host computers, using various parameters such as reservation, limit and share values. Since the resource allocation unit is a commonly found element, it is not described herein in detail. In a particular implementation, the resource allocation unit may be a component found in VMware vSphere® Distributed Resource Scheduler™. The components of the resource management module may be implemented in any combination of hardware, software and firmware. In one implementation, these components of the resource management module are implemented as one or more software programs running in the cluster management server 106 using one or more processors associated with the cluster management server.

The interference score generation unit 302 of the resource management module 108 operates to generate interference scores of different shared resources for clients running different workloads for various applications in a distributed computer system, such as the distributed computer system 100. As an example, these workloads may be workloads found in a typical datacenter. These interference scores quantify contentions for a shared resource among clients running different workloads.

In an embodiment, the interference score generation unit 302 may use a collection of micro-benchmarks to quantify interference among workloads. The individual benchmarks are created to stress each of identified sources of interference (SoIs), such as L3 cache, memory bandwidth, storage bandwidth, network bandwidth, translation lookahead buffer (TLB), floating point unit (FPU), interconnect, etc. In order to generate the interference scores, these benchmarks may be run standalone on representative servers and their performance data may be recorded. Subsequently, candidate workloads are run alongside each of these benchmarks to derive the interference scores or caused interference scores (CISs), each of which quantifies the pressure placed on a shared resource by the workload running inside a client, such as a VM. Each CIS can be represented as:

$$CIS_{v,r} = 1 - \frac{BMScore_{t,r}}{BMScore_{a,r}},$$

where $BMScore_{t,r}$ is the performance score of the workload when running together with the particular benchmark stressing resource r, and $BMScore_{a,r}$ is the performance score of the workload when running alone.

In order to derive CIS values for new workload, the interference score generation unit 302 may use a matrix factorization technique called singular value decomposition (SVD), which is commonly used for data analysis and dimension reduction. Each new workload is profiled together with two of the micro-benchmarks from the collection for a short interval, as described in a paper by C.

Delimitrou and C. Kozyrakis, titled "*Paragon: QoS-Aware scheduling for heterogeneous datacenters*." The interference scores measured get added to a matrix of resources and workloads. Existing workloads and their resource-specific interference scores form the basis of the matrix to which the incoming scores are added. SVD is used to extract the hidden relationships between workloads and resource-specific interference scores. With this approach, unknown CIS values of an incoming workload can be estimated using the information from previously profiled workloads.

In a particular implementation, the interference score generation unit 302 may generate the interference scores using Paragon-based analysis. Thus, in this implementation, the interference score generation unit may include at least some of the components found in a Paragon scheduler. However, in other implementations, the interference score generation unit may use other approaches to generate the interference scores.

In the illustrated embodiment, the interference score generation unit 302 is part of the resource management module 108. However, in other embodiments, the interference score generation unit may be an external component that is separate and independent from the resource management module. In these embodiments, the interference score generation unit may transmit the interference scores to the resource management module to be used by other components of the resource management module.

The interference rule generation unit 304 of the resource management module 108 operates to generate affinity-type rules for at least some of the clients, including client or clients to be placed for initial placement or load balancing, to mitigate interferences between them contending for the same resources. As described below, the affinity-type rules are created using the interference scores from the interference score generation unit 302.

The interference rule generation unit 302 first computes resource-level contention for each shared resource being considered using the interference scores from the interference score generation unit 302. In an embodiment, the interference rule generation unit 304 computes a resource-level interference score (RIS) for each resource as follows:

$$RIS_r = \Sigma_{\forall v \in V} CIS_{v,r},$$

where r is a shared resource being considered, V is the set of all clients, e.g., VMs, and v is a client in V.

The interference rule generation unit 304 then ranks the resources using the RIS scores. The resources may be ranked from the most contended resource to the least contended resource or vice versa. In an embodiment, for each resource, the interference rule generation unit identifies all the clients that cause contention and applies a threshold to eliminate the bottom n clients with respect to their interference scores from consideration. In some embodiments, only a predefined number or percentage of top clients are considered for each resource. In other embodiments, only a predefined number or percentage of bottom clients are eliminated from consideration for each resource. This reduces the number of clients to consider when applying the affinity-type rules.

The interference rule generation unit 304 then creates affinity-type rules for the clients under consideration in order to minimize interference or contention between clients for the same resources. The following are some common affinity-type rules:

(1) Client-host affinity rules make a group of clients affine to a group of host computers. Under these rules, the clients in the group are only placed in one of the specified host computers, and are never moved to a host computer outside of this group of host computers.

(2) Client-host anti-affinity rules make a group of clients anti-affine to a group of host computers. Under these rules, the clients in the group are never placed in any of the host computers from the specified group.

(3) Client-client anti-affinity rules make a group of clients anti-affine to each other. Under these rules, no two clients in the specified group are placed in the same host computer.

(4) Client-client affinity rules make a group of clients affine to each other. Under these rules, the clients in the group are placed in the same host computer.

In an embodiment, the interference rule generation unit 304 generates client-client anti-affinity rules for the clients under consideration to minimize the interference between the contending clients. Thus, in this embodiment, a client-client anti-affinity rule is generated for each contended resource for the clients under consideration. However, in other embodiments, the interference rule generation unit may create one or more other affinity-type rules, which may be used alone or in combination, to minimize the interference between the contending clients. The interference rule generation unit may generate any number of interference affinity-type rules, even a single interference affinity-type rule for one of the contended resources, e.g., the top ranked resource based on its RIS. Thus, the interference rule generation unit may generate one or more interference affinity-type rules for a predefined number of top ranked resources, as defined by the computed RISs.

The client placement engine 304 of the resource management module 108 operates to determine placement of a client for initial placement or for load balancing. Thus, the client placement engine selects a candidate host computer in the distributed computer system 100 that is appropriate for the placement of each client being placed. The client placement engine unit may also determine the datastore for each client being placed. The client placement engine selects candidate host computers to place clients based on at least the interference affinity-type rules created by the interference rule generation unit 304. The client placement engine may also select the candidate host computers based on other factors regarding the host computers in the cluster. These factors may include compute resources of the host computers, e.g., the CPU and RAM resources, storage resources of the host computers, network resources of the host computers, e.g., network bandwidth, and policies of the host computers, e.g., other affinity and anti-affinity rules for clients and/or host computers.

In an embodiment, the client placement engine 304 applies the interference affinity-type rules, e.g., client-client anti-affinity rules, as dispersion rules so that the "interfering" clients are placed in different host computers of the distributed computer system 100 in a best effort basis. That is, the interference affinity-type rules are not applied as hard rules that must be followed, but as soft rules that should be followed. In some implementations, the client placement engine generates dispersion scores in order to disperse the clients with an interference client-client anti-affinity rule, which would be equated to a dispersion rule. Each dispersion score may correspond to a particular distribution of clients in the distributed computer system 100, where the clients belong to the dispersion rule. Each dispersion score may be computed as a statistical dispersion measure that quantifies the degree of dispersion of clients that belong to the dispersion rule for a particular distribution, such as a standard deviation of the total number of clients in each of the host computers. The dispersion scores are then used by the client placement engine as one factor for initial placement of new clients in the distributed computer system or for load balancing of existing clients in the distributed computer system. In some implementations, the client placement engine applies a greedy hill-climbing technique using a multi-attribute or multi-dimensional decision tree analysis to determine the best possible placement recommendations. For more details regarding dispersion rules, see U.S. patent application Ser. No. 14/675,499, filed on Mar. 31, 2015, titled "RESOURCE MANAGEMENT IN DISTRIBUTED COMPUTER SYSTEMS USING DISPERSION RULES," which is incorporated herein by reference.

Using the dispersion rules, the client placement engine 304 produces client placement recommendations for initial placement or for load balancing that will result in the clients that belong to an interference client-client anti-affinity rule being dispersed in different host computers H-1, H-2 . . . H-M in the distributed computer system 100 on a best effort basis. In some embodiments, the client placement engine may consider the ranking of the resources with respect to contentions between the clients. In these embodiments, higher ranking resources may be given more weight in making the client placement recommendations. Alternatively, only certain number of top ranking resources may be considered in making the client placement recommendations.

After a placement recommendation for a client has been made by the client placement engine 304, the client can be manually or automatically placed in the recommended host computer for initial placement or for load balancing. Whether the client is automatically placed may depend on the user setting of the resource management module 108. If the resource management module is set to a manual placement setting, the recommended host computer determined by the client placement engine can be presented to the user so that the user can manually place the client in that host computer. If the resource management module is set to an automatic placement setting, the client is automatically placed in the recommended host computer. The process of placing a client, such as a VM, in a host computer (or migrating the client to a host computer in the case of load balancing) is well known and thus, is not described herein.

Figure 4:
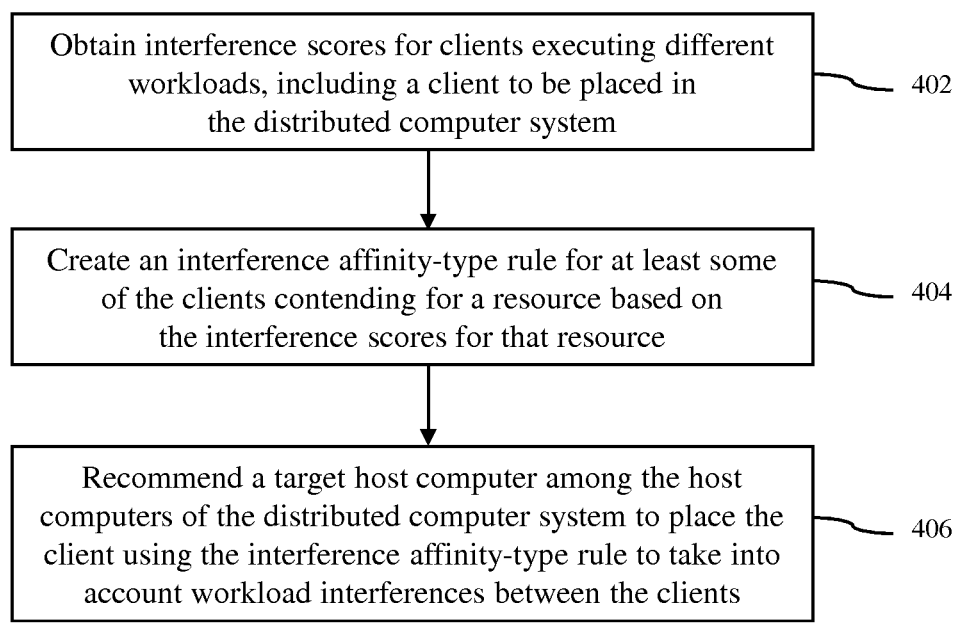
FIG. 4 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 4. At block 402, interference scores for clients executing different workloads, including a client to be placed in the distributed computer system, are obtained. At block 404, an interference affinity-type rule for at least some of the clients contending for a resource are created based on the interference scores for that resource. At block 406, a target host computer among the host computers of the distributed computer system is recommended to place the client using the interference affinity-type rule to take into account workload interferences between the clients.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource management operations in a distributed computer system, the method comprising:

obtaining interference scores for clients executing different workloads, including a client to be placed in the distributed computer system, including generating caused interference scores (CISs), each CIS being a value based on one minus a quotient of a first performance score of a particular workload when running together with a particular benchmark stressing resource and a second performance score of the particular workload when running alone to quantify pressure placed on a shared resource by workload running inside an individual client;

computing resource-level interference scores for multiple resources being considered using the sum of the interference scores of the clients for each of the multiple resources, wherein each resource-level interference score (RIS) for each of the multiple resources is computed using:

$$RIS_r = \Sigma_{\forall v \in V} CIS_{v,r},$$

where r is a resource being considered, V is a set of the clients, and v is a client in V;

ranking the multiple resources based on the resource-level interference scores to determine a top ranked resource;

creating an interference affinity-type rule for at least some of the clients contending for the top ranked resource based on the interference scores for that resource, the interference affinity-type rule being one of a client-client anti-affinity rule and a client-host anti-affinity rule; and recommending a target host computer among the host computers of the distributed computer system to place the client using the interference affinity-type rules to take into account workload interferences between the clients.

2. The method of claim 1, further comprising creating an additional interference affinity-type rule for at least some of the clients contending for another resource based on the interference scores for the another resource, wherein the another resource is based on the ranking of the multiple resources.

3. The method of claim 1, further comprising identifying the clients contending for a particular resource and applying a threshold to eliminate some of the identified clients based their interference scores, the remaining identified clients being used to create the interference affinity-type rule for the particular resource.

4. The method of claim 1, wherein the recommending the target host computer includes applying the interference affinity-type rule as a dispersion rule to place the clients in the interference affinity-type rule in different host computers in a best effort basis.

5. A non-transitory computer-readable storage medium containing program instructions for performing resource management operations in a distributed computer system, wherein execution of the program instructions by one or more processors of a computer system causes the one or more processors to perform steps comprising:

obtaining interference scores for clients executing different workloads, including a client to be placed in the distributed computer system, including generating caused interference scores (CISs), each CIS being a value based on one minus a quotient of a first performance score of a particular workload when running together with a particular benchmark stressing resource and a second performance score of the particular workload when running alone to quantify pressure placed on a shared resource by workload running inside an individual client;

computing resource-level interference scores for multiple resources being considered using the sum of the interference scores of the clients for each of the multiple resources, wherein each resource-level interference score (RIS) for each of the multiple resources is computed using:

$RIS_r = \Sigma_{\forall v \in V} CIS_{v,r}$, where r is a resource being considered, V is a set of the clients, and v is a client in V;

ranking the multiple resources based on the resource-level interference scores to determine a top ranked resource;

creating an interference affinity-type rule for at least some of the clients contending for the top ranked resource based on the interference scores for that resource, the interference affinity-type rule being one of a client-client anti-affinity rule and a client-host anti-affinity rule; and recommending a target host computer among the host computers of the distributed computer system to place the client using the interference affinity-type rules to take into account workload interferences between the clients.

6. The computer-readable storage medium of claim 5, wherein the steps further comprise creating an additional interference affinity-type rule for at least some of the clients contending for another resource based on the interference scores for the another resource, wherein the another resource is based on the ranking of the multiple resources.

7. The computer-readable storage medium of claim 5, wherein the steps further comprise identifying the clients contending for a particular resource and applying a threshold to eliminate some of the identified clients based their interference scores, the remaining identified clients being used to create the interference affinity-type rule for the particular resource.

8. The computer-readable storage medium of claim 5, wherein the recommending the target host computer includes applying the interference affinity-type rule as a dispersion rule to place the clients in the interference affinity-type rule in different host computers in a best effort basis.

9. A management server for a distributed computer system comprising:

memory; and a processor configured to:
obtain interference scores for clients executing different workloads, including a client to be placed in the distributed computer system, including generating caused interference scores (CISs), each CIS being a value based on one minus a quotient of a first performance score of a particular workload when running together with a particular benchmark stressing resource and a second performance score of the particular workload when running alone to quantify pressure placed on a shared resource by workload running inside an individual client;

compute resource-level interference scores for multiple resources being considered using the sum of the interference scores of the clients for each of the multiple resources, wherein each resource-level interference score (RIS) for each of the multiple resources is computed using:

$RIS_r = \Sigma_{\forall v \in V} CIS_{v,r}$, where r is a resource being considered, V is a set of the clients, and v is a client in V;

rank the multiple resources based on the resource-level interference scores to determine a top ranked resource;

create an interference affinity-type rule for at least some of the clients contending for the top ranked resource based on the interference scores for that resource, the interference affinity-type rule being one of a client-client anti-affinity rule and a client-host anti-affinity rule; and recommend a target host computer among the host computers of the distributed computer system to place the client using the interference affinity-type rules to take into account workload interferences between the clients.

10. The management server of claim 9, wherein the processor is configured to identify the clients contending for a particular resource and apply a threshold to eliminate some of the identified clients based their interference scores, the remaining identified clients being used to create the interference affinity-type rule for the particular resource.

11. The management server of claim 9, wherein the processor is configured to create an additional interference affinity-type rule for at least some of the clients contending for another resource based on the interference scores for the another resource, wherein the another resource is based on the ranking of the multiple resources.

12. The management server of claim 9, wherein the processor is configured to apply the interference affinity-type rule as a dispersion rule to place the clients in the interference affinity-type rule in different host computers in a best effort basis.

* * * * *